Jan. 27, 1948.  B. E. THOMAS  2,435,058
FLEXIBLE COUPLING
Filed March 6, 1943
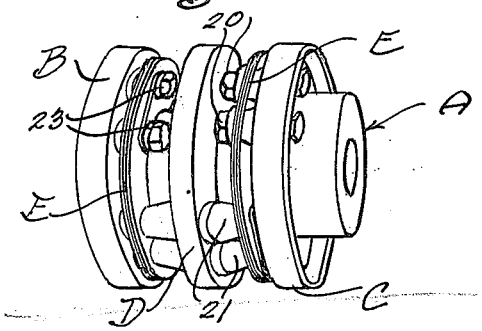
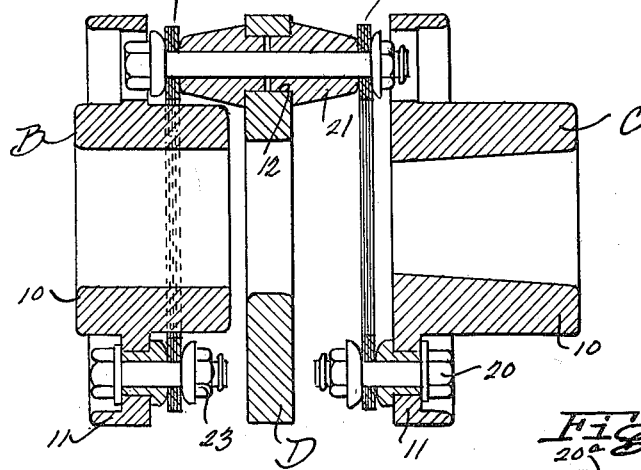
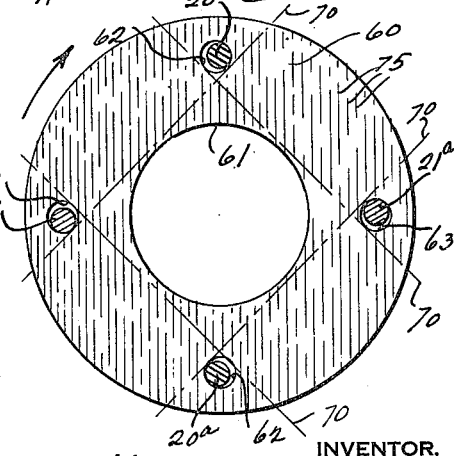
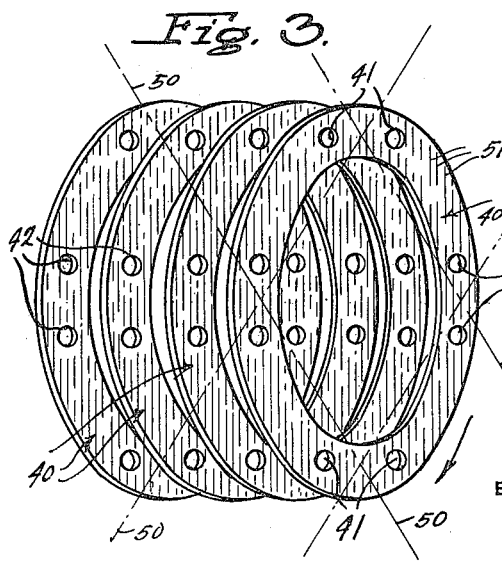
INVENTOR.
Bertha E. Thomas.
BY
ATTORNEYS.

Patented Jan. 27, 1948

2,435,058

UNITED STATES PATENT OFFICE 2,435,058

FLEXIBLE COUPLING

Bertha E. Thomas, Warren, Pa.

Application March 6, 1943, Serial No. 478,267

4 Claims. (Cl. 64—13)

This invention relates to flexible couplings adapted to be used between the drive and driven shafts of high speed heavy duty motor, turbine and compressor equipment.

The primary object of the invention is the provision of an improved flexible coupling disc which can be utilized in connection with couplings such as set forth in my Patents 2,182,711 and 2,251,722 for the purpose of improving the tensile strength of the coupling.

Other objects and advantages will be apparent during the course of the following detailed description.

In the accompanying drawing, forming a part of this specification, and wherein similar reference characters designate corresponding parts thruout the several views, Figure 1 is a perspective view of the improved coupling.

Figure 2 is a cross sectional view of the coupling, the upper half of the view being taken on a plane at right angles with respect to the section plane of the lower half.

Figure 3 is a perspective view of a series of discs used in the coupling and with which the novelty of this invention is particularly concerned.

Figure 4 is a view of a modified form of improved coupling disc.

In the drawing, wherein for the purpose of illustration are shown preferred and modified forms of the invention, the letter A may generally designate the improved coupling which may consist of so-called end flanges or coupling members B and C; a center ring or member D and sets E of the discs, comprising a laminated arrangement thereof connecting the end flanges or coupling members B and C with the center member D, for purposes which have been more specifically detailed in my above identified patents.

It will be well understood by those skilled in this art that drive and driven shafts are connected to the coupling flanges B and C; either of them being the driving flange. Each of them consists of a hub 10 and an attaching flange 11.

The center ring or member D is of ring-shape formation and apertured at 12 for receiving the bolts which connect the disc set E with the coupling members B and C.

The end flange C is provided with diametrically opposed companion pairs of bolts 20 which connect this flange directly with the set E of flexible discs, and in right angled relation therewith. The same set of flexible discs is connected to the center ring D by diametrically opposed companion pairs of bolt assemblages 21.

The end flange B is similarly connected to its adjacent set E of flexible discs by means of diametrically opposed companion pairs of bolt assemblages 23, and the center member D is connected with the end flange B, thru the set E of flexible discs, by diametrically opposed companion pairs of bolts 21; the latter being the same bolts above mentioned as connecting said center member with the end flange C.

The particular construction of the bolt assemblages 20, 21 and 23 has been described in detail in my above mentioned patents and need not further be referred to for the purposes of this invention. It is sufficient to say that the set E of flexible discs connect the end flanges with the center member in a flexible manner to compensate for both parallel and angular misalignment of the drive and driven shafts, and to compensate for end float of said shafts so that there will be no pressure at all upon the shaft bearings. It is obvious that thereby wear, vibration, end thrust and cross pull have been eliminated, and power is transmitted in straight tension from the drive shaft to the driven shaft.

Referring to the type of disc 40 shown in Figure 3 of the drawing, such is intended to be used in the set E above mentioned. Each of these discs is of ring-shape formation, and flat. They are relatively thin and transversely flexible and fabricated so that the grain of the steel is located in grain lines arranged at a bias to the line of force application upon the disc. These discs are stamped from rolled sheet metal, which obviously can vary according to requirements. The grain of the steel runs the long ways of these sheets, and when the ring-shaped discs are stamped from the steel, the bolt openings thereof are arranged so that the line of force application between the drive and driven bolts intersects the grain lines of the discs at an angle of 45°, or any angular bias which otherwise serves the purpose.

Each of the discs 40 is provided with four companion pairs of openings, each pair of openings being arranged in a zone at an angle of 90° with respect to the adjacent zone. As shown in Figure 3, opposed pairs of openings 41 are disposed 180° apart and are adapted to receive either the drive or the driven bolts and the diametrically opposed complementary pairs of openings 42 are adapted to receive the other bolts which are not connected in the openings 41. Thus, assuming the set of discs E to connect the end flange C and the center member D, the companion pairs of bolt openings 41 would receive the bolt assemblages 21. Assuming the direction of rotation of the coupling to be that indicated by the arrow in Figure 3, and assuming the end flange 10 to be attached to the driving shaft, with the bolt assemblages 20 connected in the companion pairs of openings 42 and the bolt assemblages 21 connected in the companion pairs of openings 41, the lines of force would be those designated at 50 (dot and dash lines) in Figure 3 of the drawing.

It is to be noted that the miscellaneously interrupted dot and dash lines designated 51 upon the discs represent the grain run of the steel, and this grain lining is such that the same is disposed on a bias (at an angle of 45° preferably) with respect to the lines of force application designated at 50 in Figure 3. No matter how the discs 40 are arranged, either as shown in Figure 3 or at random, the lines of force will always be disposed at an angle of 45° with respect to the grain lining of the discs.

The disposition of the grain lining of the disc at an angle of 45° with respect to the lines of force application, increases the tensile strength of the disc set and the individual discs. If reference is made to my Patent 2,182,711, it will be noted that the grain lines run parallel or at exactly right angles with respect to the lines of force application. If the graining line runs parallel with the line of force application, for the particular steel which is principally used by Thomas Flexible Coupling Company, of Warren, Pennsylvania, the yield point has been found to be 107,700 pounds per square inch. If the grain lining runs at right angles to the line of force application, the yield point in pounds per square inch for the same type of steel has been found to be 98,100. However, I have discovered that by placing the grain run on a bias, or at 45° with respect to the line of force application, the yield point has been increased to 116,700 pounds per square inch. This is a very important advantage not only from the standpoint of economy and durability, but also because I am thereby enabled to provide a flexible coupling which will take the extreme loads imposed upon flexible couplings utilized in connection with high speed heavy duty motor, Diesel engine, turbine and compressor operations. This added advantage will be well understood by those who are directly interested in flexible couplings utilized with Diesel engines employed in submarine construction and operation.

In the modified form of flexible coupling discs shown in Figure 4, designated at 60, I provide a disc in which the grain lining runs the same as for the discs 40 above described, but in which the straight lines extending between all adjacent bolt zones do not intersect the opening 61 in the disc. In other words there is a full run of metal between adjacent bolt zones measured along a straight line between the centers thereof. Thereby, the disc is additionally strengthened. This is effected principally as shown in Figure 4 of the drawings, by placing the axes of the bolt openings closer to the outer peripheral edge of the ring-shaped disc than the inner peripheral edge. Of course this would not be necessary if the central opening of the disc were sufficiently small, but there are limits to the minimum diameter of this opening, imposed by the diameter of the drive and driven shafts, and the required flexibility of the disc. With respect to the disc 60, assume the same to have diametrically opposed bolt openings 62, and another pair of diametrically opposed openings 63 in right angled relation with the openings 62. Assuming that the direction of rotation of the coupling disc is as designated by the arrow in Figure 4, the bolts 20ᵃ will be the driving bolts and the bolts 21ᵃ will be the driven bolts. It will be noted that the dot and dash lines 70, designated in Figure 4, represent the inside lines of force application upon the disc between the drive and driven bolts so that there is a full line of metal in the disc between all lines of force application extending directly between the drive and driven bolts. This will increase the strength of the disc.

It will of course be noted that the grain lines of the disc 60, which are designated by the broken line 75, are disposed at an angle of 45° with respect to all force lines.

While I do not desire to be limited to diametrically opposed sets of drive and driven bolt arrangements, in which the drive bolt zones are disposed at angles of 90° with respect to the driven bolt zone, yet such an arrangement is optimum, since thereby the lines of force are arranged at angles of 45° with respect to the grain lines.

It was brought out in my U. S. Patent 2,182,711 that the grain lines of adjacent discs were arranged at angles of 90° with respect to each other. This was for the purpose of increasing the durability and effectiveness of the laminated disc set. However, it is not necessary to take this precaution with the grain lining of the steel disposed at a bias to the line of force application and the discs can be assembled at random with the assurance that the yield points of each disc along the line of force application will be the same regardless of the assemblage of such discs made according to the present invention.

Various changes in the discs of this invention, and in the method of producing and assembling the same in a flexible coupling may be made, without departing from the spirit of the invention or the scope of the claims.

I claim:

1. As an article of manufacture, a flexible metal disc for flexible couplings, of ring-shaped formation, having opposed zones of bolt application at 180° apart for receiving driving bolts, and similarly opposed zones of bolt application at 180° apart for receiving driven bolts; the zones of bolt application for the drive and driven bolts being disposed at 90° apart and the grain lines of the metal being disposed with its lines at a bias with respect to the lines of force running directly between the zones receiving the driving and driven bolts and at an angle of 45° with respect thereto.

2. As an article of manufacture, a stainless steel flexible ring-shaped disc for flexible couplings constructed of rolled stainless steel, the same having drive and driven bolt zones disposed respectively at 90° apart in such arrangement that straight lines extending between all adjacent zones of the drive and driven bolts are disposed at a bias with respect to the grain lining of the disc at an angle of 45° with respect thereto.

3. As an article of manufacture, a grain lined rolled flexible metal disc of ring-shaped formation having diametrically opposed bolt openings therein for receiving driving bolts and also diametrically opposed openings therein for receiving driven bolts; the latter openings being disposed at 90° with respect to the former openings, the grain lining of the disc being disposed so that the same is on a bias with respect to lines of force extending directly between the drive and driven bolt openings and at an angle of 45° with respect thereto.

4. As an article of manufacture, a grain lined rolled flexible metal disc of ring-shaped formation having diametrically opposed bolt openings therein for receiving driving bolts and also diametrically opposed openings therein for receiving driven bolts; the latter openings being disposed at 90° with respect to the former openings, the grain lining of the disc being disposed so that the same is on a bias with respect to lines of force extending directly between the drive and driven bolt openings and at an angle of 45° with respect thereto, the said openings being disposed in the disc so that there is a full run of metal in any part of the area extending directly between any adjacent drive and driven bolt openings.

BERTHA E. THOMAS.

REFERENCES CITED

The following references are of record in the file of this patent:

UNITED STATES PATENTS

| Number | Name | Date |
| --- | --- | --- |
| 351,987 | Lewis | Nov. 2, 1886 |
| 1,378,109 | Hecht | May 17, 1921 |
| 1,398,163 | Stokes | Nov. 22, 1921 |
| 1,575,927 | Morse | Mar. 9, 1926 |
| 1,647,114 | MacDonald | Oct. 25, 1927 |
| 2,182,711 | Thomas | Dec. 5, 1939 |

Certificate of Correction

Patent No. 2,435,058.                                                                                      January 27, 1948.

BERTHA E. THOMAS

It is hereby certified that error appears in the printed specification of the above numbered patent requiring correction as follows: Column 4, lines 62 and 63, claim 2, for the words "straight lines extending between all adjacent" read *the lines of force application between the*; and that the said Letters Patent should be read with this correction therein that the same may conform to the record of the case in the Patent Office.

Signed and sealed this 20th day of April, A. D. 1948.

[SEAL]

THOMAS F. MURPHY,
*Assistant Commissioner of Patents.*